United States Patent
Kurita et al.

(10) Patent No.: US 11,914,896 B2
(45) Date of Patent: Feb. 27, 2024

(54) MEMORY SYSTEM AND WRITE CONTROL METHOD

(71) Applicant: Kioxia Corporation, Tokyo (JP)

(72) Inventors: Takahiro Kurita, Sagamihara (JP); Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 184 days.

(21) Appl. No.: 17/338,758

(22) Filed: Jun. 4, 2021

(65) Prior Publication Data

US 2022/0043604 A1    Feb. 10, 2022

(30) Foreign Application Priority Data

Aug. 6, 2020 (JP) ................. 2020-133936

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0652* (2013.01); *G06F 3/0679* (2013.01)

(58) Field of Classification Search
CPC ...... G06F 3/0659; G06F 3/0604; G06F 3/064; G06F 3/0652; G06F 3/0679; G06F 3/0608; G06F 3/061; G06F 3/0634; G06F 3/0688; G06F 2212/214; G06F 12/0246; G11C 2211/5641
See application file for complete search history.

(56) References Cited

U.S. PATENT DOCUMENTS

| | | | |
|---|---|---|---|
| 8,954,655 B2 | 2/2015 | Jean et al. | |
| 9,195,604 B2 * | 11/2015 | Nemazie | G06F 12/0246 |
| 10,380,018 B2 | 8/2019 | Muchherla et al. | |
| 10,509,597 B2 | 12/2019 | Gaewsky et al. | |
| 2012/0195118 A1 * | 8/2012 | Yang | G11C 16/34 365/185.03 |
| 2015/0293713 A1 | 10/2015 | Seo et al. | |
| 2017/0177469 A1 | 6/2017 | Hashimoto | |
| 2018/0081543 A1 * | 3/2018 | Muchherla | G06F 3/0653 |
| 2019/0034105 A1 | 1/2019 | Natarajan et al. | |
| 2020/0073795 A1 | 3/2020 | Asano | |

FOREIGN PATENT DOCUMENTS

| | | |
|---|---|---|
| JP | 2015-204118 A | 11/2015 |
| JP | 2016-508276 A | 3/2016 |
| JP | 2019-121350 A | 7/2019 |
| JP | 6568387 B2 | 8/2019 |
| JP | 2020-035128 A | 3/2020 |

\* cited by examiner

*Primary Examiner* — Curtis James Kortman
(74) *Attorney, Agent, or Firm* — Oblon, McClelland, Maier & Neustadt, L.L.P.

(57) ABSTRACT

According to one embodiment, a memory system includes a nonvolatile memory and a controller. The nonvolatile memory is correspond to a first mode of writing data of N bits per unit area and a second mode of writing data of M bits (M>N) per unit area. When receiving a first command issued prior to a write command to instruct writing write data to the nonvolatile memory, the controller selects one or both of the first mode and the second mode for writing the write data to the nonvolatile memory, to allow writing the write data to the nonvolatile memory to be executed in the first mode as much as possible, based on a capacity of the write data specified by the first command and a capacity of a free area of the nonvolatile memory.

11 Claims, 9 Drawing Sheets

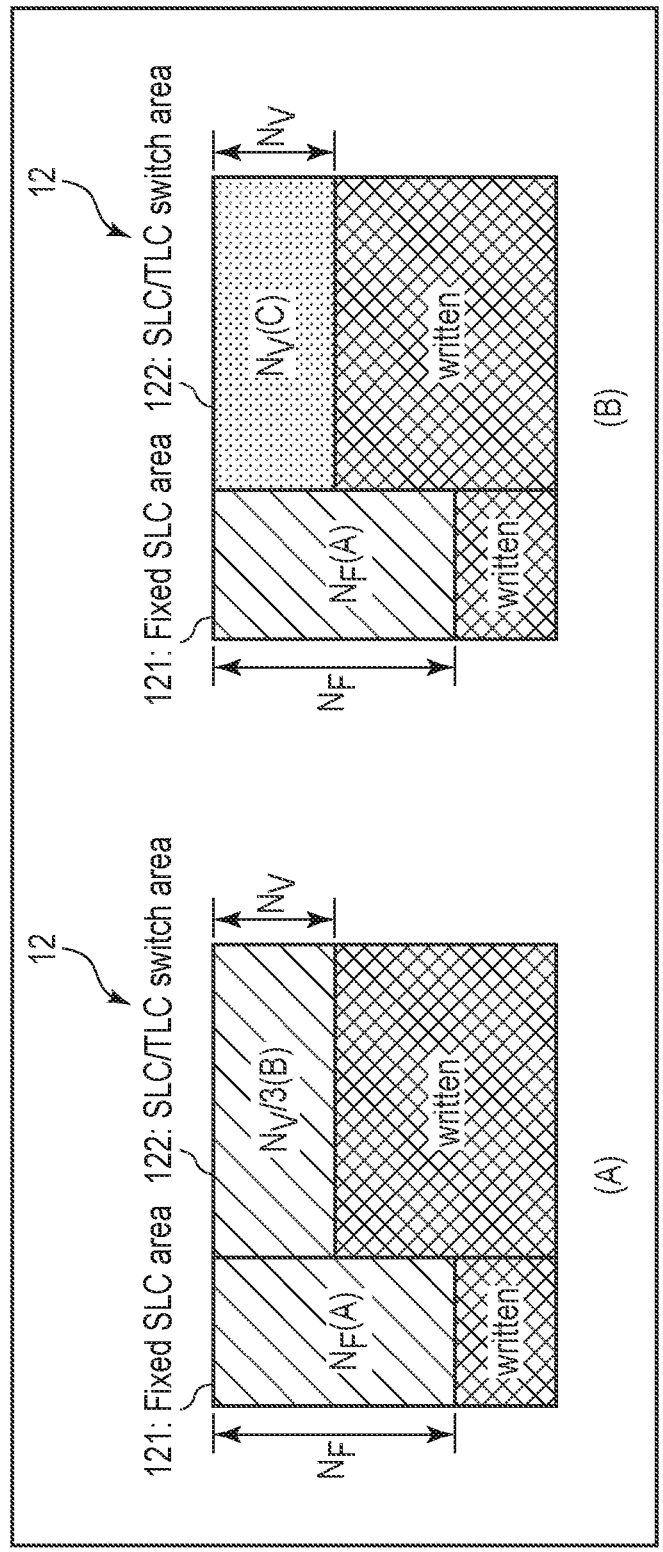
F I G. 6

MEMORY SYSTEM AND WRITE CONTROL METHOD

CROSS-REFERENCE TO RELATED APPLICATIONS

This application is based upon and claims the benefit of priority from Japanese Patent Application No. 2020-133936, filed Aug. 6, 2020, the entire contents of which are incorporated herein by reference.

FIELD

Embodiments described herein relate generally to a memory system and a write control method.

BACKGROUND

A memory system such as a solid state drive (SSD) comprises a function of selecting a write format expected to be optimum in accordance with internal conditions such as conditions of dispersed data and conditions of friction of storage mediums. In a method of selecting such a write format, for example, when a host transitions to a suspend state or when data write is to be ended in a shortest time, the write performance of the memory system often cannot be exerted.

BRIEF DESCRIPTION OF THE DRAWINGS

FIG. 6 is a diagram illustrating a case where the memory system of the embodiment executes the SLC write or the TLC write to the entire SLC/TLC switch area.

DETAILED DESCRIPTION

Various embodiments will be described hereinafter with reference to the accompanying drawings.

In general, according to one embodiment, a memory system includes a nonvolatile memory and a controller. The controller controls writing data to the nonvolatile memory or reading data from the nonvolatile memory in response to a command from a host. The nonvolatile memory is configured to correspond to a first mode of writing data of N bits per unit area and a second mode of writing data of M bits (M>N) per unit area. When receiving a first command issued prior to a write command to instruct writing write data to the nonvolatile memory, the controller selects one or both of the first mode and the second mode for writing the write data to the nonvolatile memory, to allow writing the write data to the nonvolatile memory to be executed in the first mode as much as possible, based on a capacity of the write data specified by the first command and a capacity of a free area of the nonvolatile memory.

Figure 1:
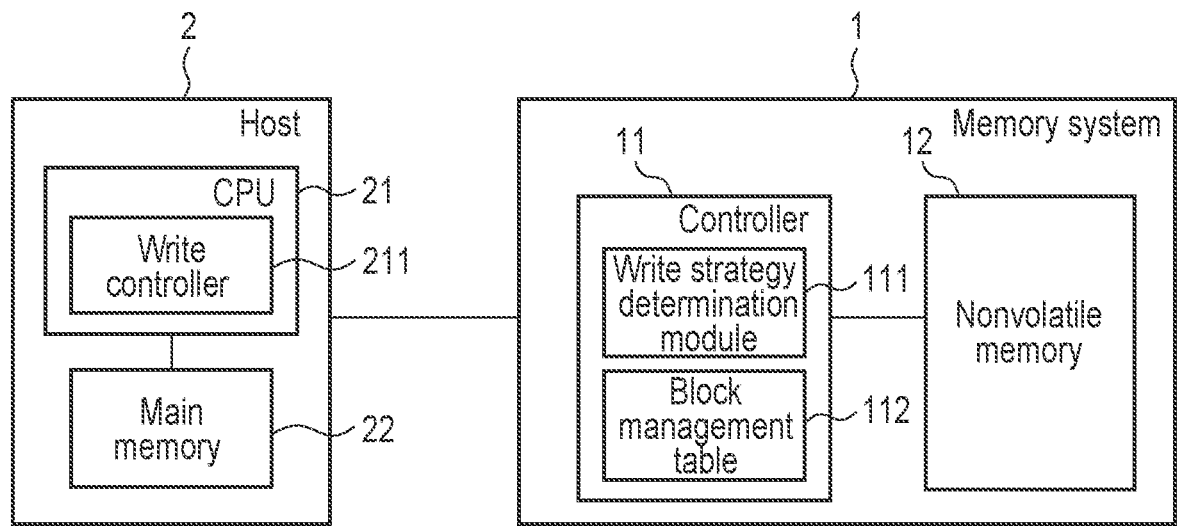
FIG. 1 is a diagram illustrating a configuration example of a memory system according to an embodiment.

FIG. 1 is a diagram illustrating a configuration example of a memory system according to an embodiment. FIG. 1 illustrates a configuration example of an information processing system including a memory system 1 and a host 2 connected to the memory system 1.

An example that the memory system 1 is implemented as SSD is illustrated. The host 2 is an information processing apparatus such as a personal computer or a server. The memory system 1 and the host 2 can be connected by, for example, an interface conforming to PCI Express (PCIe)™ specifications.

The memory system 1 incorporates a controller 11 and a nonvolatile memory 12. The controller 11 is configured as, for example, system on a chip (SoC). The nonvolatile memory 12 is, for example, a NAND flash memory.

The controller 11 executes a process of writing data received from the host 2 to the nonvolatile memory 12, a process of reading data from the nonvolatile memory 12 as requested by the host 2, and the like, based on commands issued by the host 2. That is, the controller 11 controls the nonvolatile memory 12, based on the commands issued by the host 2.

The nonvolatile memory 12 is configured to correspond to a single level cell (SLC) mode of writing data of 1 bit per cell and a triple level cell (TLC) mode of writing data of 3 bits per cell. Therefore, the controller 11 can write the data of each bit per cell to the nonvolatile memory 12 in the SLC mode and can write the data of each 3 bits per cell to the nonvolatile memory 12 in the TLC mode. The nonvolatile memory 12 includes a plurality of blocks, and the controller 11 can control the write formats (SLC mode and the TLC mode) for each block. The write format is also referred to as a write mode. It is assumed here that writing the data in the SLC mode is completed in a shorter time than writing the data in the TLC mode. That is, it is assumed that writing the data of smaller number of bits per cell is completed in a shorter time than writing the data of larger number of bits per cell.

Incidentally, the SLC mode and the TLC mode are assumed as the write modes that can be employed by the controller 11 at the time of writing the data to the nonvolatile memory 12. However, the write modes are not limited to these, but may be, for example, the SLC mode and quad level cell (QLC) mode of 4 bits per cell. Alternatively, for example, the write modes may be the TLC mode and the QLC mode, or may be the SLC mode, the TLC mode and the QLC mode. That is, the nonvolatile memory 12 can be configured to correspond to two or more any write modes of various combinations.

The controller 11 can receive from the host 2 a command of instructing writing the data in the shortest time and interpret a use thereof. The command of instructing writing the data in the shortest time is prepared with, for example, a command whose use can be freely defined under the PCIe specification by a vendor. In addition, the controller 11 comprises a write strategy determination module 111. When receiving the command of instructing writing the data in the shortest time, the write strategy determination module 111 selects the SLC mode or the TLC mode for writing the write data to the nonvolatile memory 12, such that writing the write data transmitted from the host 2, to the nonvolatile memory 12, is executed in the SLC mode as much as possible.

More specifically, for example, the write strategy determination module 111 determines a ratio of the SLC mode to the TLC mode which should be applied to writing the write data to the nonvolatile memory 12, based on the capacity of the write data to be written that is specified by a parameter and the capacity of the free area of the nonvolatile memory 12. Details of the write strategy determination module 111 will be described later.

Figure 2:
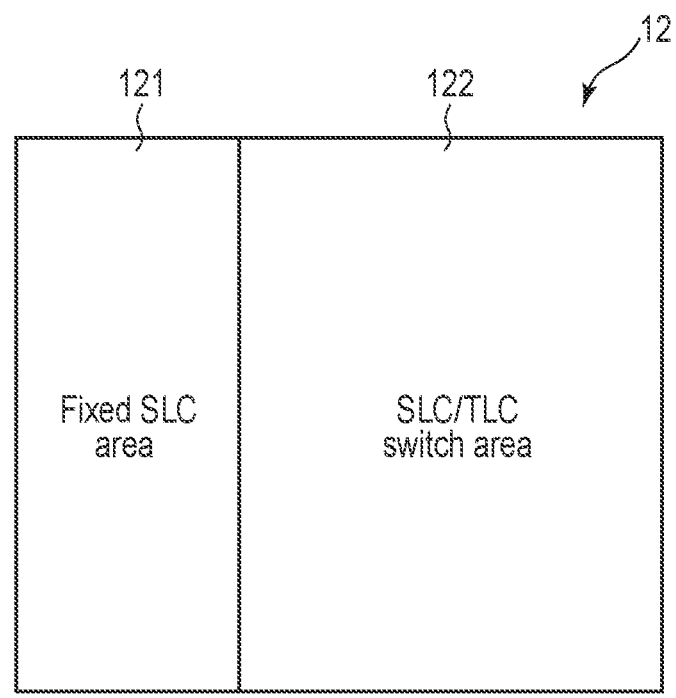
FIG. 2 is a diagram illustrating division of a nonvolatile memory into a fixed SLC area and an SLC/TLC switch area in the memory system of the embodiment.

In addition, the controller 11 can divide the area of the nonvolatile memory 12 into a fixed SLC area 121 and an SLC/TLC switch area 122 as shown in FIG. 2. More specifically, the controller 11 can classify a plurality of blocks in the nonvolatile memory 12 into the fixed SLC area 121 and the SLC/TLC switch area 122. The fixed SLC area 121 is an area where the SLC mode is applied in a fixed manner. In contrast, the SLC/TLC switch area 122 is an area to which the SLC mode and the TLC mode can be applied adaptively and mixedly. The controller 11 includes a block management table 112 for managing the information on each of the blocks in the nonvolatile memory 12 that can be divided into two areas. The block management table 112 includes at least information indicating (1) whether each block in the nonvolatile memory 12 belongs to the fixed SLC area 121 or the SLC/TLC switch area 122 and (2) which of the SLC mode and the TLC mode is applied when the block belongs to the SLC/TLC switch area 122. The block management table 112 is provided in, for example, an internal memory (not shown) of the controller 11.

The nonvolatile memory 12 has a structure in which data is unable to be overwritten to an area where data is already written. For this reason, when updating the already written data, the controller 11 writes new data to an unwritten area in the block or the other block, and handles the previous data as invalid data. That is, the controller 11 writes update data corresponding to a certain logical address not to a physical storage location in which corresponding previous data is stored, but to the other physical storage location. Then, the controller 11 associates the new physical storage location with the logical address and invalidates the previous data. For this reason, in the rate of the valid data to the invalid data in each block, the invalid data tends to be larger as the time elapses. In other words, the valid data rate tends to be lowered. To reuse the area where the invalid data remains, the controller 11 executes a process referred to as garbage collection (GC).

The GC is a process of selecting two or more blocks in order of a lower valid data rate, for example, as movement source blocks of the valid data, moving the valid data in the movement source block to blocks (movement destination blocks) whose number is smaller than the total number of movement source blocks, and thereby generating free blocks whose number is a difference between the total number of movement source blocks and the total number of movement destination blocks. When the free blocks generated by the GC are the blocks selected from the fixed SLC area 121 as the movement source blocks, the free blocks are allocated again to the fixed SLC area 121. When the free blocks generated by the GC are the blocks selected from the SLC/TLC switch area 122, the free blocks are allocated again to the SLC/TLC switch area 122. Incidentally, the valid data can be moved from one to the other, of the fixed SLC area 121 and the SLC/TLC switch area 122. For example, the movement source blocks may be the blocks of the fixed SLC area 121 and the movement destination blocks may be the blocks of the SLC/TLC switch area 122. In addition, for example, the blocks of the fixed SLC area 121 and the blocks of the SLC/TLC switch area 122 may be mixed and selected as the movement source blocks. The number of free blocks in each of the fixed SLC area 121 and the SLC/TLC switch area 122 is also included as information of the block management table 112. The write strategy determination module 111 can acquire the capacity of the free area in each of the fixed SLC area 121 and the SLC/TLC switch area 122 by referring to the block management table 112.

The host 2 includes a CPU 21 and a main memory 22. The CPU 21 runs various programs stored in the main memory 22 such that various processing modules including a write controller 211 can be configured in the host 2. The operating system (OS), applications operating under the OS, and the like are present as various programs.

The write controller 211 is a processing module which issues a command to instruct writing the data in the shortest time. For example, when the user executes the power-off operation to shift the host 2 to the suspend state, the OS saves in the memory system 1 the data necessary to restore an environment of the power-off operation at a next power-on operation. That is, the host 2 executes writing the data to the memory system 1. Writing the data is a process which is to be ended in the shortest time for the host 2. In this case, the write controller 211 issues a command to instruct writing the data in the shortest time prior to issuing the write command by the OS. In addition, at this time, the write controller 211 acquires the capacity of the data that the OS is to save in the memory system 1, and notifies the memory system 1 of the capacity of the data as, for example, a parameter. The method of acquiring the capacity of the write data to be written is not limited to a particular method, but various methods can be employed as the acquiring method. In addition, issuing the command to instruct writing the data in the shortest time can be executed not only at the power-off time, but in various scenes.

Figure 3:
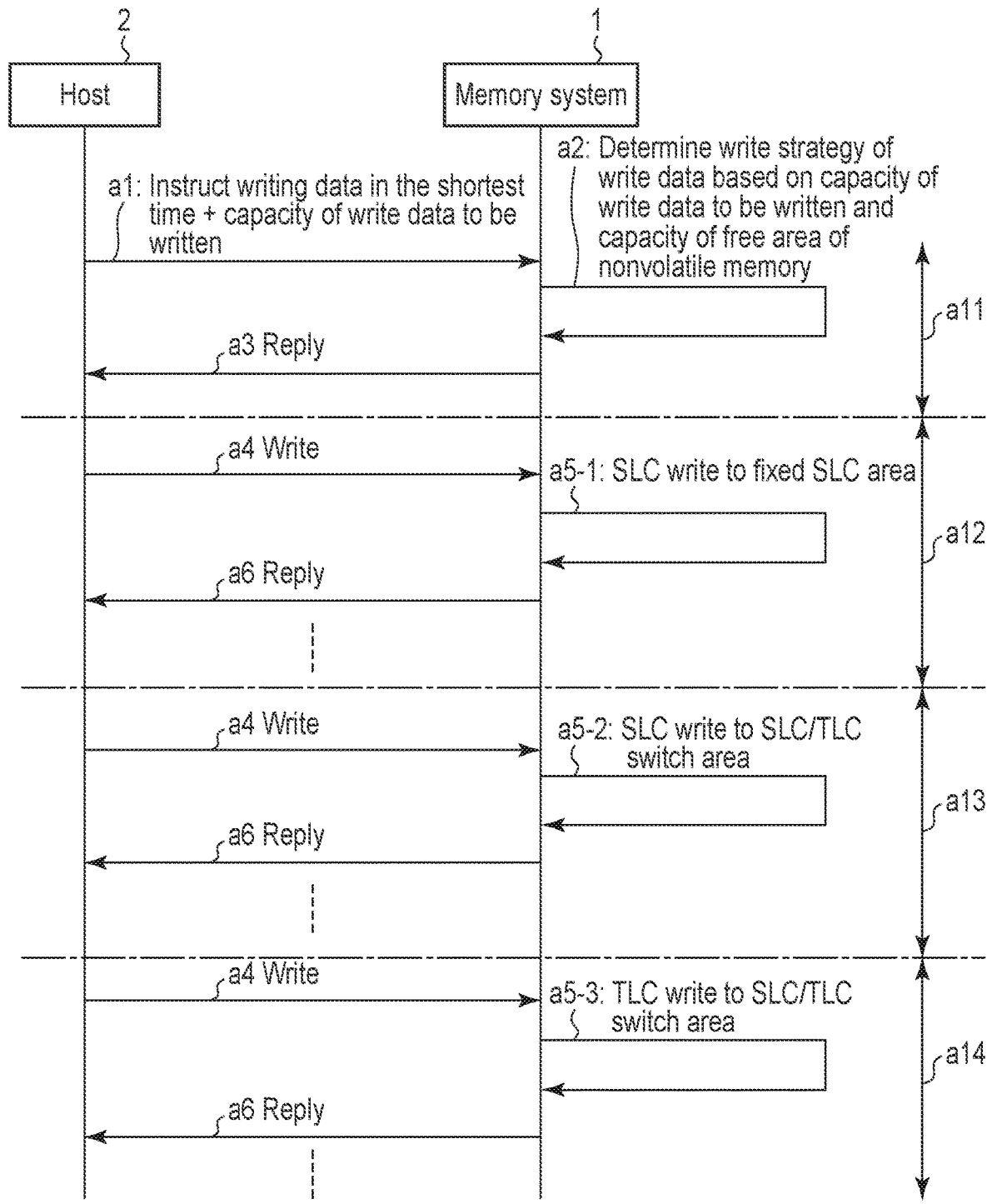
FIG. 3 is a sequence chart illustrating an example of a rough operation flow in writing data between the memory system and a host in a shortest time according to the embodiment.

FIG. 3 is a sequence chart illustrating an example of a rough operation flow of the memory system 1 and the host 2 at the time of writing data in the shortest time.

First, the host 2 issues the command to instruct writing the data in the shortest time for the memory system 1 (a1). In addition, at this time, the host 2 notifies the memory system 1 of the capacity of the write data to be written, by, for example, a parameter.

After receiving the command from the host 2, the memory system 1 determines a write strategy, based on the capacity of the write data to be written, and on the capacity of the free area of the nonvolatile memory 12, more specifically, the capacity of the free area in each of the fixed SLC area 121 and the SLC/TLC switch area 122. The memory system 1 selects the write area and the write mode in order of priority of the following (1) to (3) such that writing the data to the nonvolatile memory 12 is executed in the SLC mode as much as possible.

(1) Write to the fixed SLC area 121 in the SLC mode (SLC write), (2) Write to the SLC/TLC switch area 122 in the SLC mode, and (3) Write to the SLC/TLC switch area 122 in the TLC mode (TLC write).

For example, when the capacity of the write data is smaller than or equal to the capacity of the free area of the fixed SLC area 121 (i.e., the writable capacity in the SLC mode), the memory system 1 determines the write strategy of executing only (1). When the capacity of the write data exceeds the capacity of the free area of the fixed SLC area 121 and when the capacity of a difference therebetween is smaller than or equal to the writable capacity in the SLC mode of the free area of the SLC/TLC switch area 122, the memory system 1 determines the write strategy of executing (1) and (2). When the capacity of the write data exceeds the capacity of the free area of the fixed SLC area 121 and when the capacity of a difference therebetween exceeds the writable capacity in the SLC mode of the free area of the SLC/TLC switch area 122, the memory system 1 determines the write strategy of executing all (1) to (3). In addition, in this case, the memory system 1 further determines the rate of (2) and (3) so as to execute (2) as much as possible.

Incidentally, only (2) of (1) and (2) may be executed in accordance with the situation of the nonvolatile memory 12. Alternatively, only (2), (2) and (3), or only (3), of (1) to (3) may be executed.

FIG. 3 shows an example of a case where the write strategy of executing all (1) to (3) is determined by the memory system 1. The memory system 1 transmits to the host 2 an acknowledgment message to notify that the command to instruct writing data in the shortest time has been received (a3). The acknowledgment message may be transmitted after the write strategy is determined or may be transmitted quickly at the timing of receiving the command. Alternatively, transmission of the acknowledgment message may be omitted.

When the acknowledgment message is transmitted from the memory system 1, the host 2 starts issuing the write command to instruct writing the write data (a4). When the transmission of the acknowledgment message is omitted, the host 2 starts issuing the write command immediately after transmitting the command to instruct writing the data in the shortest time. After that, the host 2 repeats issuing the write command (a4) every time the host 2 receives the acknowledgment message to notify write completion (a6) until transmission of all the write data is ended, without recognizing what write strategy causes writing the data to the nonvolatile memory 12 to be executed in the memory system 1.

In contrast, the memory system 1 executes SLC write to the fixed SLC area 121 (a5-1), SLC write to the SLC/TLC switch area 122 (a5-2), and TLC write to the SLC/TLC switch area 122 (a5-3), in response to the write command from the host 2, based on the determined write strategy.

Thus, the memory system 1 executes writing the data in the shortest time as instructed by the host 2, in four steps indicated by reference numerals a11 to a14. Reference numeral a11 is indicative of a step of determining the write strategy. Reference numeral a12 is indicative of a step of writing the write data to the fixed SLC area 121 in the SLC mode. Reference numeral a13 is indicative of a step of writing the write data to the SLC/TLC switch area 122 in the SLC mode. Reference numeral a14 is indicative of a step of writing the write data to the SLC/TLC switch area 122 in the TLC mode. The write strategy determination module 111 of the memory system 1 controls "determination of the write strategy" of the first step (a11).

Next, "determination of the write strategy" executed by the write strategy determination module 111 will be described.

Figure 4:
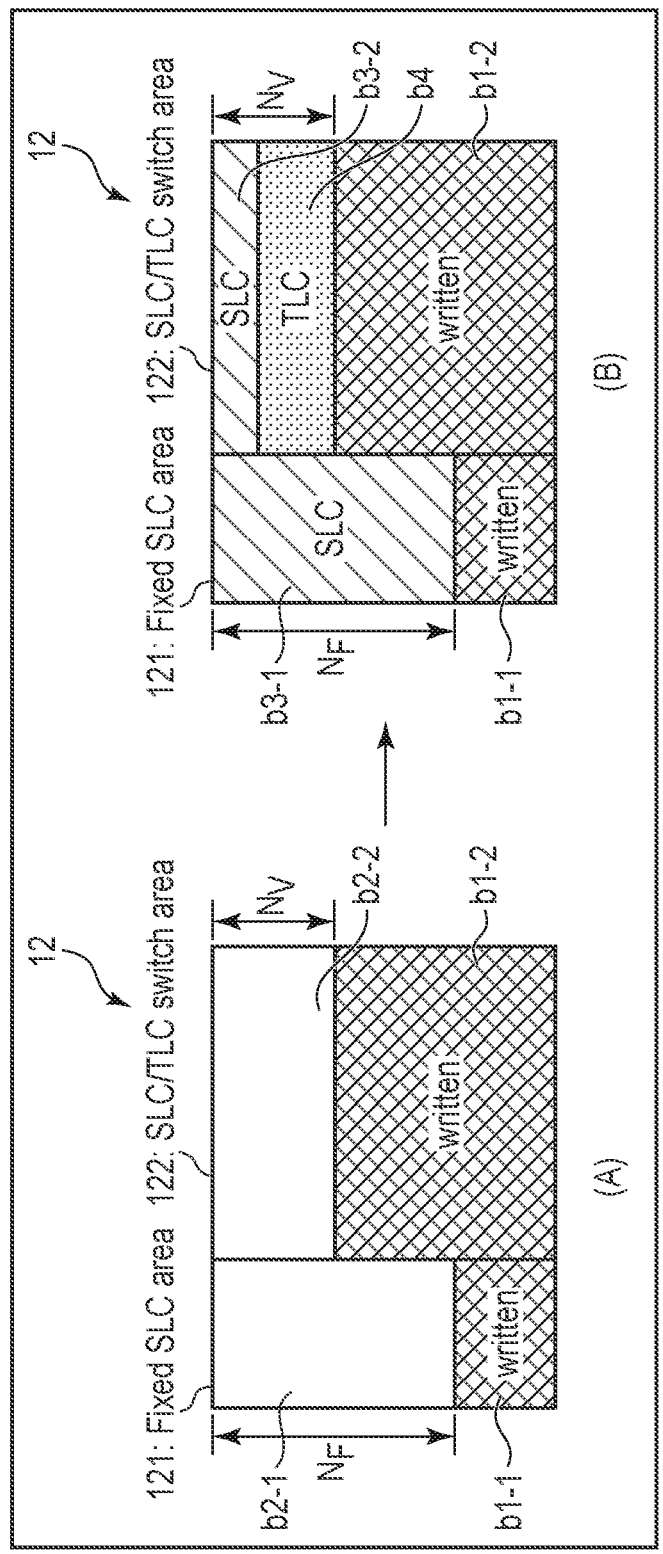
FIG. 4 is a diagram illustrating an example of a method of determining a write strategy to which the memory system of the embodiment is applied.

FIG. 4 is a diagram illustrating an example of a method of determining the write strategy employed by the write strategy determination module 111.

FIG. 4(A) shows an example of the state of the nonvolatile memory 12 at the time of receiving the instruction to write the data in the shortest time from the host 2. An area indicated by reference numeral b1-1 in the fixed SLC area 121 is an area where data are already written. In contrast, an area indicated by reference numeral b2-1 in the fixed SLC area 121 is a free area where the write data transmitted from the host 2 can be written. Similarly, an area indicated by reference numeral b1-2 in the SLC/TLC switch area 122 is an area where data are already written, and an area indicated by reference numeral b2-2 in the SLC/TLC switch area 122 is a free area where the write data transmitted from the host 2 can be written.

The capacity of the free area of the fixed SLC area 121 is referred to as $N_F$ [byte], the capacity of the free area of the SLC/TLC switch area 122 is referred to as $N_V$ [byte] (in TLC), and the capacity of the write data transmitted from the host 2 is referred to as W [byte]. The write strategy determination module 111 defines the following [1] to [3] with respect to (1) to (3) mentioned above.

[1] SLC write of $N_F$ at maximum to the fixed SLC area 121

[2] SLC write of $(N_F+N_V-W)/2$ to the SLC/TLC switch area 122

[3] TLC write of $(3W-3N_F-N_V)/2$ to the SLC/TLC switch area 122

Then, the write strategy determination module 111 determines the write strategy of the write data in accordance with (a) to (c) mentioned below.

(a) If $W<=N_F$: execute [1]
(b) If $N_F<W<=N_F+N_V/3$: execute [1] and [2]
(c) If $N_F+N_V/3<W<=N_F+N_V$: execute [1] to [3]

For example, if $N_F+N_V/3<W<=N_F+N_V$, the write strategy determination module 111 determines the write strategy of executing [1] to [3]. FIG. 4(B) shows an example of the nonvolatile memory 12 when the memory system 1 writes the write data which are instructed to be written in the shortest time by the write strategy (c) mentioned above. An area indicated by reference numeral b3-1 in the fixed SLC area 121 is an area where the write data are written in the SLC mode. An area indicated by reference numeral b3-2 in the SLC/TLC switch area 122 is also an area where the write data are written in the SLC mode. In contrast, an area indicated by reference numeral b4 in the SLC/TLC switch area 122 is an area where the write data are written in the TLC mode. The write strategy determination module 111 determines the rate of the area b3-2 to the area b4 in the SLC/TLC switch area 122 such that the capacity of the area b3-2 is maximized, when $N_F+N_V/3<W<=N_F+N_V$.

Figure 5:
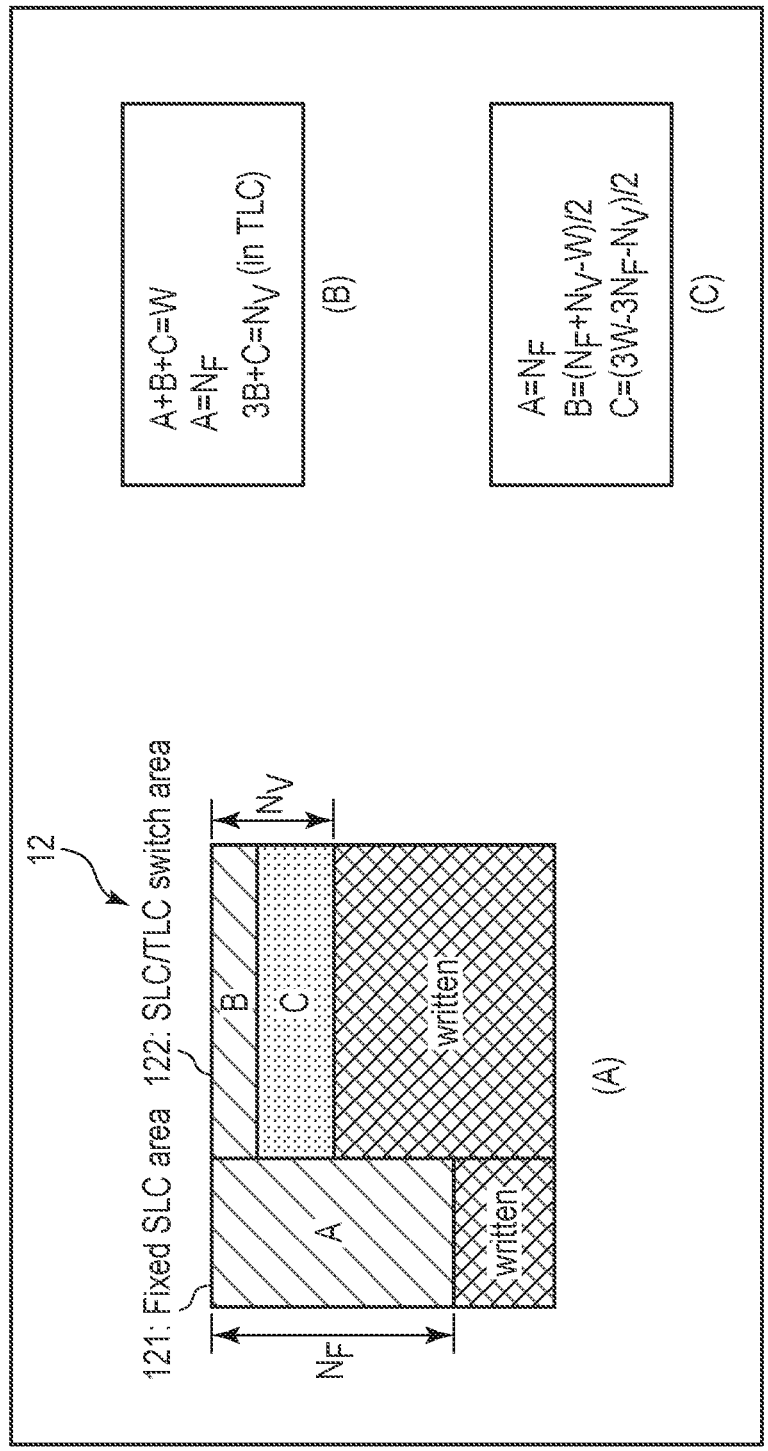
FIG. 5 is a diagram illustrating an SLC write capacity and a TLC write capacity to the SLC/TLC switch area in the memory system of the embodiment.

Next, the write capacity $(N_F+N_V-W)/2$ in the SLC mode to the SLC/TLC switch area 122, and the write capacity $(3W-3N_F-N_V)/2$ in the TLC mode to the SLC/TLC switch area 122 will be described with reference to FIG. 5.

The capacity of the data written to the area b3-1 of FIG. 4(B) is referred to as A, the capacity of the data written to the area b3-2 is referred to as B, and the capacity of the data written to the area b4 is referred to as C (FIG. 5(A)). Thus, the following three expressions can be obtained (FIG. 5(B)).

$$A+B+C=W \quad \text{(Expression 1)}$$

$$A=N_F \quad \text{(Expression 2)}$$

$$3B+C=N_V (\text{in TLC}) \quad \text{(Expression 3)}$$

Incidentally, since B is the capacity of the data written in the SLC mode, the area of 3B in TLC is consumed.

(Expression 1) can be modified to B=W−A−C (Expression 1-2), and (Expression 3) can be modified to C=$N_V$−3B (Expression 3-2). When (Expression 2) and (Expression 3-2) are substituted to (Expression 1-2), B=W−$N_F$−($N_V$−3B) (Expression 1-3), and (Expression 1-3) can be modified to B=($N_F$+$N_V$−W)/2.

In addition, (Expression 1) can be modified to C=W−A−B (Expression 1-2'), and (Expression 3) can be modified to B=($N_V$−C)/3 (Expression 3-2'). When (Expression 2) and (Expression 3-2') are substituted to (Expression 1-2'), C=W−$N_F$−(($N_V$−C)/3) (Expression 1-3'), and (Expression 1-3') can be modified to C=(3W−3$N_F$−$N_V$)/2.

As a result, three expressions A=$N_F$, B=($N_F$+$N_V$−W)/2, and C=(3W−3$N_F$−$N_V$)/2 can be obtained (FIG. 5(C)). That is, the write capacity in the SLC mode to the SLC/TLC switch area 122, i.e., ($N_F$+$N_V$−W)/2, and the write capacity in the TLC mode to the SLC/TLC switch area 122, i.e., (3W−3$N_F$−$N_V$)/2, are derived.

FIG. 6(A) shows the write strategy determined when W=$N_F$+$N_V$/3, and FIG. 6(B) shows the write strategy determined when W=$N_F$+$N_V$.

When W=$N_F$+$N_V$/3, this case corresponds to (b) of the above-mentioned (a) to (c), and the write strategy determination module 111 determines the write strategy of executing [1] and [2].

If W=$N_F$+$N_V$/3 is substituted into the expressions of FIG. 5(C), the expressions will be as follows:

$$A=N_F$$

$$B=(N_F+N_V-(N_F+N_V/3))/2=N_V/3$$

$$C=(3(N_F+N_V/3)-3N_F-N_V)/2=0$$

Therefore, as shown in FIG. 6(A), $N_F$ in the write data is written to the fixed SLC area 121 in the SLC mode, and the remaining parts are written to the SLC/TLC switch area 122 in the SLC mode. When W<$N_F$+$N_V$/3, the same operations are executed (where $N_F$<W).

When W=$N_F$+$N_V$, this case corresponds to (c) of the above-mentioned (a) to (c), and the write strategy determination module 111 determines the write strategy of executing above-mentioned [1] to [3].

If W=$N_F$+$N_V$ is substituted into the expressions of FIG. 5(C), the expressions will be as follows:

$$A=N_F$$

$$B=(N_F+N_V-(N_F+N_V))/2=0$$

$$C=(3(N_F+N_V)-3N_F-N_V)/2=N_V$$

Therefore, as shown in FIG. 6(B), $N_F$ in the write data is written to the fixed SLC area 121 in the SLC mode, and the remaining parts are written to the SLC/TLC switch area 122 in the TLC mode.

That is, the write strategy determination module 111 can select the SLC mode or the TLC mode so as to allow writing the write data to the nonvolatile memory 12 to be executed in the SLC mode as much as possible, by setting the write capacity in the SLC mode to the SLC/TLC switch area 122 to ($N_F$+$N_V$−W)/2 and setting the write capacity in the TLC mode to the SLC/TLC switch area 122 to (3W−3$N_F$−$N_V$)/2.

Incidentally, when the SLC/TLC switch area 122 is the SLC/QLC switch area, the module can select the SLC mode or the QLC mode so as to allow writing the write data to the nonvolatile memory 12 to be executed in the SLC mode as much as possible, similarly, by setting the write capacity in the SLC mode to the SLC/QLC switch area 122 to ($N_F$+$N_V$−W)/3 and setting the write capacity in the QLC mode to the SLC/QLC switch area 122 to (4W−4$N_F$−$N_V$)/3.

By the way, as described above, the controller 11 can control the write mode (SLC mode or TLC mode) for each block. Therefore, in the SLC/TLC switch area 122, a process of a fraction of the write capacity in the SLC mode computed by ($N_F$+$N_V$−W)/2 mentioned above is often required.

For example, storing one block of 3M bytes (in TLC) (1M bytes in SLC) is assumed. In addition, it is assumed that the capacity ($N_V$) of the free area of the SLC/TLC switch area 122 is 30 Mbytes (in TLC), i.e., 10 blocks and the capacity (W−$N_F$) of writing to the SLC/TLC switch area 122 is 21 Mbytes (W=$N_F$+21).

In this case, when the capacity is computed, the write capacity in the SLC mode to the SLC/TLC switch area 122 is ($N_F$+30−($N_F$+21))/2=4.5 Mbytes. In contrast, the write capacity in the TLC mode to the SLC/TLC switch area 122 is (3($N_F$+21)−3$N_F$−30)/2=16.5 Mbytes. The write of 4.5 Mbytes in the SLC mode is assumed to use 5 blocks. In remaining 5 blocks, only 15 Mbytes are written in the TLC mode. Therefore, writing cannot be executed in the capacity required by the host 2.

Thus, if the write capacity in the SLC mode to the SLC/TLC switch area 122 generates a fraction when divided by the block size, the write strategy determination module 111 writes the capacity required by the host 2 by truncating the part. More specifically, the write strategy of setting the write capacity in the SLC mode to the SLC/TLC switch area 122 to 4 Mbytes, setting the number of blocks used to 4, and executing 17-Mbyte write in the TLC mode in remaining 6 blocks is determined. Since 18-Mbyte write in 6 blocks can be executed in the TLC mode, writing the capacity required by the host 2 can be completed.

In addition, when W>$N_F$+$N_V$, the controller 11 needs to execute GC and generate free blocks. When receiving the command to instruct writing the data in the shortest time, the situation W>$N_F$+$N_V$ may occur in accordance with the capacity of the write data specified by the parameter or the like and the capacity of the free area of the nonvolatile memory 12. At this time, GC aims to generate the free block of W−($N_F$+$N_V$).

Figure 7:
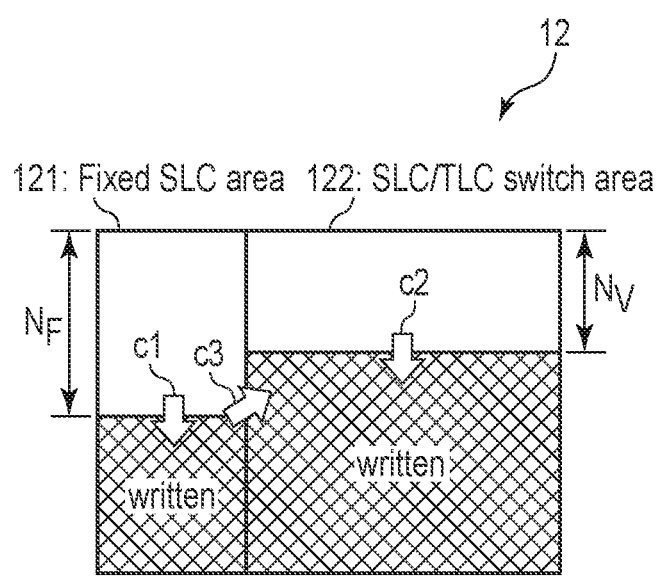
FIG. 7 is a diagram illustrating a type of GC which can be executed in the memory system of the embodiment.

In the memory system 1 of dividing the area of the nonvolatile memory 12 into the fixed SLC area 121 and the SLC/TLC switch area 122, three methods of GC are roughly classified as shown in FIG. 7.

<1> the movement source block of the valid data is the fixed SLC area 121, and the movement destination block is also the block of the fixed SLC area 121: c1

<2> the movement source block of the valid data is the block of the SLC/TLC switch area 122, and the movement destination block is also the block of the SLC/TLC switch area 122: c2

<3> the movement source block of the valid data is the fixed SLC area 121, and the movement destination block is the block of the SLC/TLC switch area 122: c3

In addition, <2> can be further classified into three methods, and <3> can be further classified into two methods.

Subclassification of <2>
<2-1> Apply SLC mode→apply SLC mode
<2-2> Apply TLC mode→apply TLC mode
<2-3> Apply SLC mode→apply TLC mode
Subclassification of <3>
<3-1> Apply SLC mode→apply SLC mode
<3-2> Apply SLC mode→apply TLC mode Incidentally, in GC which aims to generate a free block, Apply TLC mode→Apply SLC mode where the consumed capacity of the area of the nonvolatile memory 12 may be increased at a high possibility is not considered here. Thus, in the memory system 1 of dividing the area of the nonvolatile memory 12 into the fixed SLC area 121 and the SLC/TLC switch area 122, six methods of GC are considered.

In the GC required at the time receiving the command to instruct writing the data in the shortest time, the write strategy determination module 111 determines the strategy of generating a free area of a specific capacity in the shortest time.

The write strategy determination module 111 first selects the GC of moving the valid data present in the block to which the SLC mode of the SLC/TLC switch area 122 is applied, of <2-3>, to the block to which the TLC mode of the SLC/TLC switch area 122 is applied.

Figure 8:
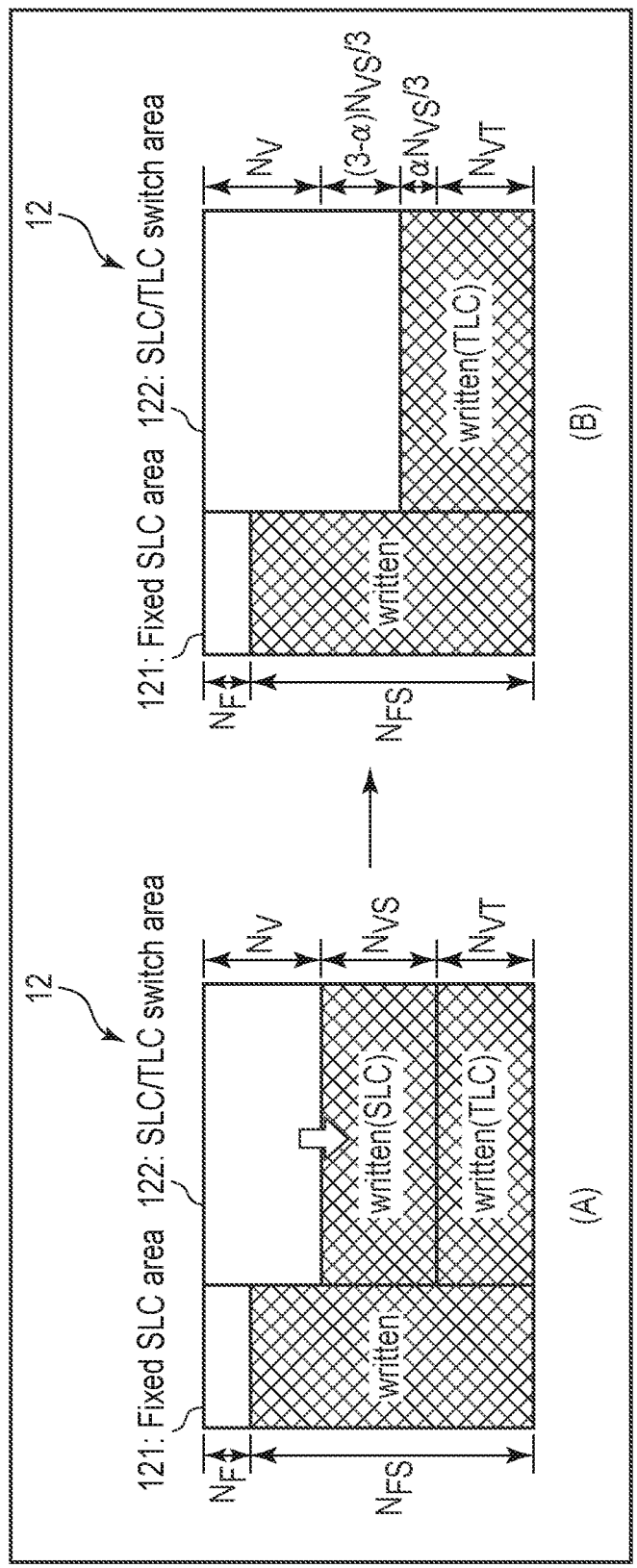
FIG. 8 is a diagram illustrating GC in a first stage of the memory system of the embodiment.

FIG. 8 is a diagram illustrating the GC of <2-3> mentioned above, where (A) illustrates a situation before the GC, and (B) shows a situation after the GC. Incidentally, in FIG. 8, $N_{VS}$ and $N_{VT}$ refer to the capacity in TLC of the number of blocks occupied by the written data.

Even if the valid data rate of the block $N_{VS}$ to which the SLC mode is applied is 100%, the free block of $2N_{VS}/3$ at the maximum can be squeezed. The situation in which the valid data rate is 100% is a situation in which no invalid data is present.

When the valid data rate is referred to as $\alpha(0<\alpha<=1)$, the free block of $(3-\alpha)N_{VS}/3$ at the maximum can be squeezed. More specifically, the free block of $(3-\alpha)N_{VS}/3$ can be squeezed by TLC write of $\alpha N_{VS}/3$ ($N_{VS}-\alpha N_{VS}/3$).

In addition, when there is no block to which the SLC mode is applied in the SLC/TLC switch area 122 or when the free block of the target $W-(N_F+N_V)$ cannot be generated in <2-3> mentioned above and there is no block to which the SLC mode is applied, the write strategy determination module 111 secondarily selects one or both of the CC of moving the valid data present in the block to which the SLC mode is applied, of the fixed SLC area 121, to the block to which the TLC mode is applied, of the SLC/TLC switch area 122, in <3-2> mentioned above, and the GC of moving the valid data present in the block to which the TLC mode is applied, of the SLC/TLC switch area 122, to the block to which the TLC mode is applied, of the SLC/TLC switch area 122, in <2-2> mentioned above.

Figure 9:
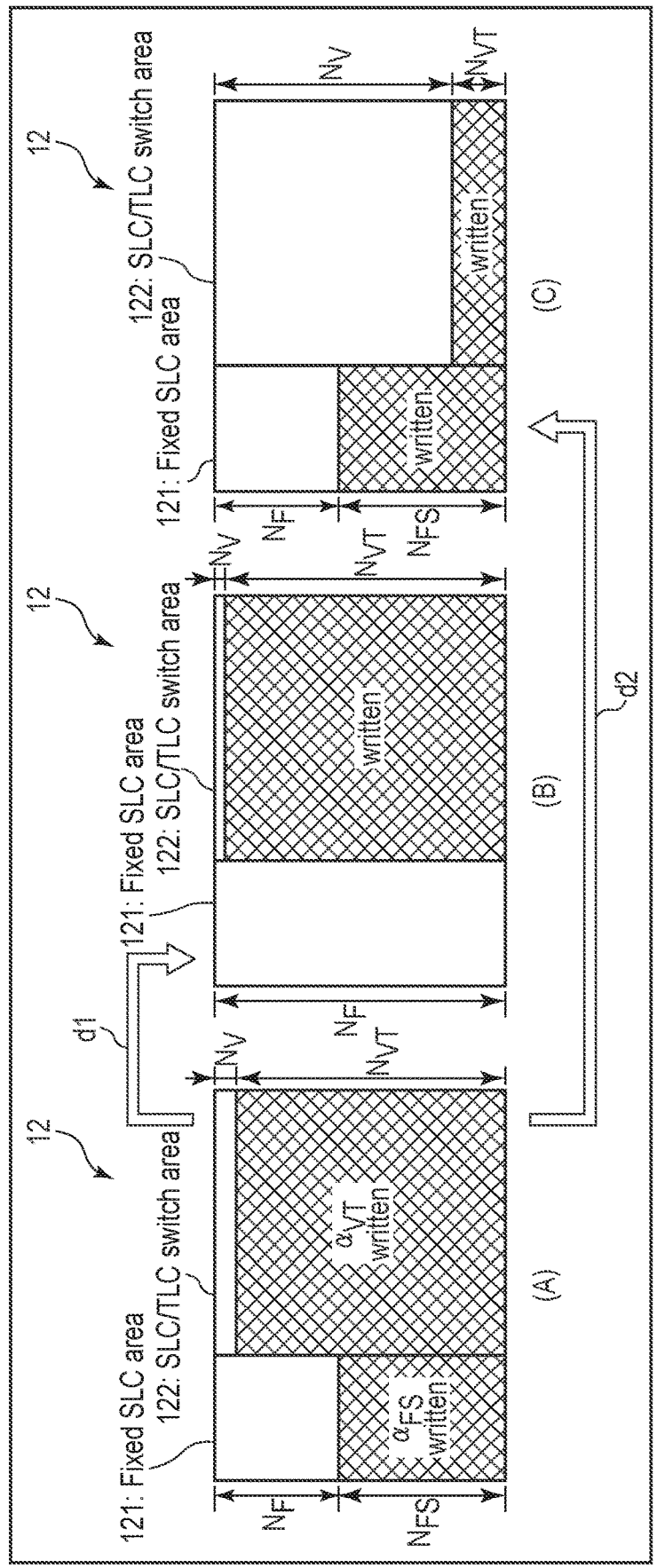
FIG. 9 is a diagram illustrating GC in a second stage of the memory system of the embodiment.

FIG. 9 is a diagram illustrating the GC of <3-2> and <2-2> mentioned above, where (A) illustrates a situation before the GC, (B) illustrates a situation after the GC of <3-2>, and (C) illustrates a situation after the GC of <2-2>. In FIG. 9, $\alpha_{FS}$ refers to the valid data rate of the block to which the SLC mode of the fixed SLC area 121 is applied, and $\alpha_{VT}$ refers to the valid data rate of the block to which the TLC mode of the SLC/TLC switch area 122 is applied.

When $\alpha_{FS}$ is smaller than or equal to a threshold value and when W is approximately $N_F+N_{FS}$, executing the GC of <3-2> mentioned above and writing the write data to the fixed SLC area 121 can be ended more rapidly than executing the GC of <2-2> mentioned above and executing writing (d1). In contrast, when $\alpha VT$ is smaller than or equal to a threshold value, executing the GC of <2-2> mentioned above can be executed more efficiently (d2). The write strategy determination module 111 may adaptively select <3-2> mentioned above or <2-2> mentioned above, based on $\alpha_{FS}$, W, $\alpha_{VT}$, and the like or may determine the strategy to be executed by combining both of them, irrespective of $\alpha_{FS}$, W, $\alpha_{VT}$, and the like. In addition, when determining that ending the GC in the shortest time can be executed, the write strategy determination module 111 may not execute <2-3>, but execute <3-2> or <2-2>.

Figure 10:
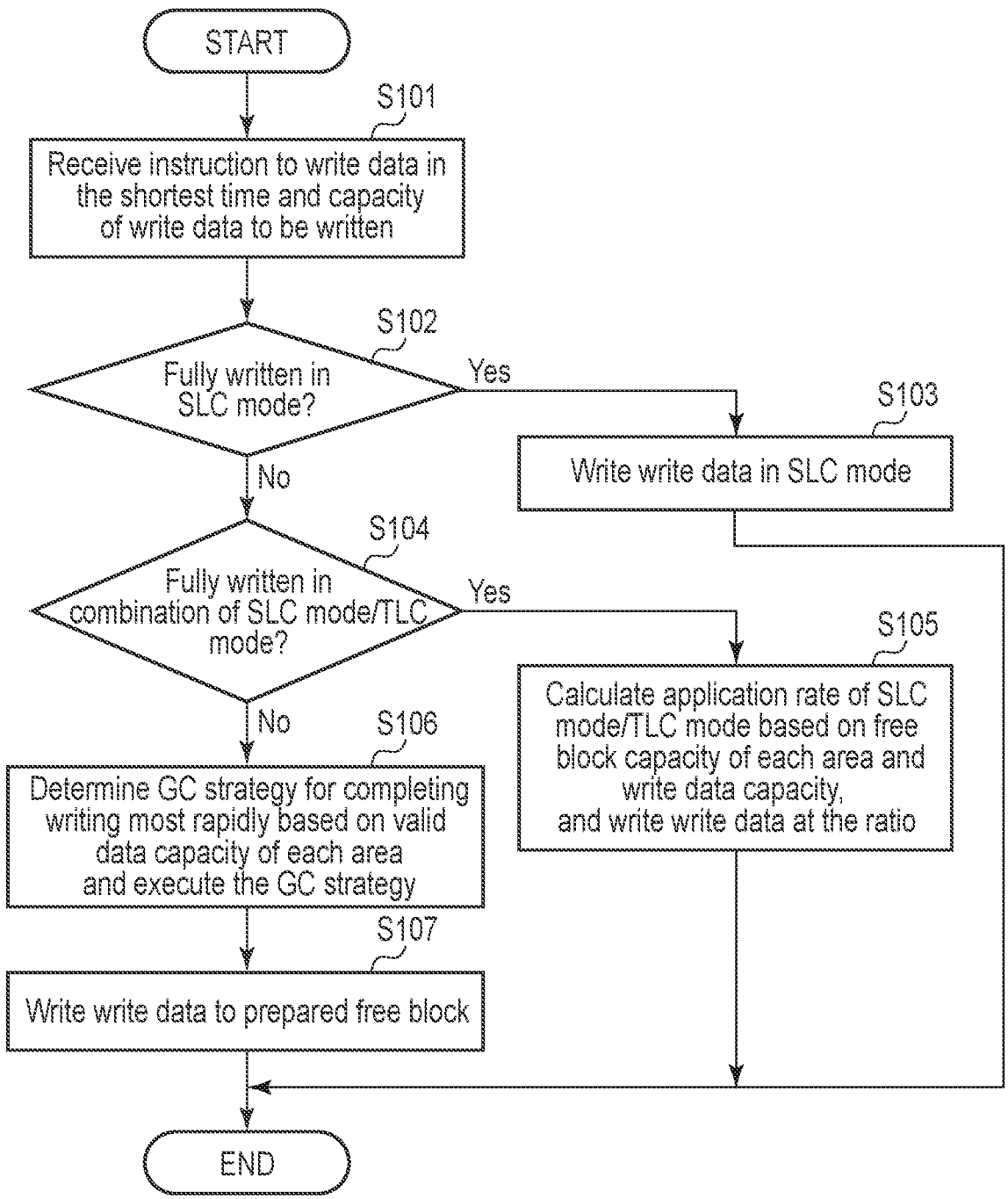
FIG. 10 is a flowchart illustrating an example of a procedure when receiving an instruction of writing data in the shortest time in the memory system according to the embodiment.

FIG. 10 is a flowchart illustrating an example of a procedure of operations at the time of receiving the instruction to write the data in the shortest time of the memory system 1.

The memory system 1 receives the instruction to write the data in the shortest time and the capacity of the write data to be written (S101). The memory system 1 determines whether the write data is fully written in the SLC mode or not, based on the received capacity of the write data to be written and the free block capacity of each of the areas (fixed SLC area 121 and SLC/TLC switch area 122) of the nonvolatile memory 12 (S102).

When the data is fully written in the SLC mode (S102: Yes), the memory system 1 writes the write data in the SLC mode (S103). The area to which the write data is to be written may be the only fixed SLC area 121, both of the fixed SLC area 121 and the SLC/TLC switch area 122, or the only SLC/TLC switch area 122.

In contrast, when the data is not fully written in the SLC mode (S102: No), the memory system 1 determines whether the write data can be fully written in a combination of the SLC mode and the TLC mode or not (S104). This determination may be provisional, i.e., determining whether the total of the writable capacity in the SLC mode to the fixed SLC area 121 and the writable capacity in the TLC mode to the SLC/TLC switch area 122 exceeds the write data capacity or not. When the data is fully written (S104: Yes), the memory system 1 calculates the rate of application of the SLC mode and the TLC mode, based on the free block capacity of each area and the write data capacity, and writes the write data at the calculated ratio (S105).

In addition, when the data cannot be fully written by a combination of the SLC mode and the TLC mode, the memory system 1 determines the GC strategy of completing writing the write data most rapidly, based on the valid data capacity of each area, and executes the GC strategy (S106). Then, the memory system 1 writes the write data to the prepared free block including the free block generated by the GC (S107).

As described above, when instructed to write the data in the shortest time by the host 2, the memory system 1 of the present embodiment can select one or both of the SLC mode and the TLC mode, for writing the write data to the nonvolatile memory 12, such that the SLC mode is applied as much as possible, based on the write data capacity specified by the host 2 and the free block capacity of each area (fixed SLC area 121 and SLC/TLC switch area 122) of the nonvolatile memory 12. In addition, when the GC is required, too, the GC strategy can be determined such that writing the write data to the nonvolatile memory 12 is ended most rapidly.

Incidentally, after receiving the command to instruct writing the data in the shortest time, the memory system 1 may determine whether each write data transmitted from the host 2 by the write command is the target of the command to instruct writing the data in the shortest time or not, for example, by the parameter of the write command. For example, when the write data out of target is transmitted while interrupting the target write data, the memory system 1 may hold writing the write data out of target, write the target write data, execute the GC as needed, and execute writing the write data out of target.

In addition, as described above, the command to instruct writing the data in the shortest time can be issued not only when the host 2 turns off at the power, but in various scenes. When the write capacity to the nonvolatile memory 12 reaches the specified capacity of the write data to be written, the memory system 1 subsequently may select the write mode to be applied to the writing to the nonvolatile memory 12 required by the write command, under the rule applied in a normal time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
    a nonvolatile memory; and
    a controller configured to control writing data to the nonvolatile memory or reading data from the nonvolatile memory in response to a command from the host, wherein
    the nonvolatile memory is configured to correspond to a first mode of writing data of N bits per unit area and a second mode of writing data of M bits (M>N) per unit area, and
    the controller is configured to:
        receive, from the host, a write command to write write data to the nonvolatile memory,
        set a first area and a second area in the nonvolatile memory, the first area being an area to which the first mode is applied in a fixed manner, the second area being an area to which the first mode and the second mode can be applied mixedly;
        write, using the first mode, a part or all parts of the write data to a free area of the first area, when the free area is present in the first area;
        compare a difference between a size of the write data and a capacity writable using the first mode in the free area of the first area, with a capacity writable using the first mode in a free area of the second area, when the size of the write data is larger than the capacity writable using the first mode in the free area of the first area;
        write, using the first mode and to the free area of the second area, all remaining data of the write data after writing to the free area of the first area, when the difference is smaller than or equal to the capacity writable using the first mode in the free area of the second area; and
        determine a write capacity of using the first mode in the free area of the second area and a write capacity of using the second mode in the free area of the second area for writing all the remaining data of the write data, such that the write capacity of the first mode in the free area of the second area is maximally utilized, and write all the remaining data of the write data to the determined write capacity using the first mode in the free area of the second area and the determined write capacity using the second mode in the free area of the second area, when the difference is larger than the capacity writable using the first mode in the free area of the second area.

2. The memory system of claim 1, wherein:
    the nonvolatile memory has a structure in which data is unable to be overwritten to an area where data is already written; and
    the controller is configured to execute garbage collection for reusing an area where unnecessary data in the nonvolatile memory remains, when the difference exceeds the capacity writable using the second mode in the free area of the second area.

3. The memory system of claim 2, wherein:
    the nonvolatile memory is configured to include a plurality of blocks; and
    the controller is configured to:
        select, when a block exists in the second area and in which data is stored using the first mode, the block in the second area and in which data is stored using the first mode, as a movement source block of valid data,
        select a free block in the second area as a movement destination block of the valid data, and
        execute garbage collection by writing, using the second mode, the valid data to the free block in the second area.

4. The memory system of claim 3, wherein when the block in the second area and in which data is stored using the first mode does not exist, the controller is configured to:
    select one or both of a block in the first area and in which data is stored using the first mode and a block in the second area in and in which data is stored using the second mode as the movement source block of valid data, and
    execute garbage collection by writing the valid data to the free block in the second area in the second mode.

5. The memory system of claim 2, wherein:
    the nonvolatile memory is configured to include a plurality of blocks; and
    the controller is configured to:
        select one or both of a block in the first area and in which data is stored using the first mode and a block in the second area in and in which data is stored using the second mode as a movement source block of valid data,
        select a free block in the second area as a movement destination block of the valid data, and
        execute garbage collection by writing, using the second mode, the valid data to the free block in the second area.

6. The memory system of claim 1, wherein:
    the nonvolatile memory includes a plurality of blocks; and
    when the determined write capacity using the first mode in the free area of the second area is unable to be divided by a capacity of a block when operated in the first mode, the controller is configured to exclude a fraction generated as a remainder from the writeable capacity using the first mode in the free area of the second area.

7. The memory system of claim 6, wherein the controller is configured to recognize the size of write data from a first parameter included in the write command.

8. A write control method comprising:
    dividing a nonvolatile memory into a first area and a second area, the first area being an area to which a first mode of writing data of N bits per unit area is applied in a fixed manner, the second area being an area to which the first mode and a second mode of writing data of M bits (M>N) per unit area can be applied mixedly;

receiving a plurality of write commands for writing corresponding write data to the nonvolatile memory;

writing, using the first mode, a part or all parts of each of the corresponding write data for the plurality of write commands to a free area of the first area, in response to determining the free area is present in the first area for each command;

for at least one write command of the plurality of write commands, comparing a difference between the size of the corresponding write data and a capacity writable using the first mode in the free area of the first area, with a capacity writable using the first mode in a free area of the second area, in response to determining the size of the corresponding write data is larger than the capacity writable using the first mode in the free area of the first area;

for at least one write command of the plurality of write commands, writing, using the first mode and to the free area of the second area, all remaining data of the corresponding write data after writing to the free area of the first area, in response to determining the difference is smaller than or equal to the capacity writable using the first mode in the free area of the second area; and for at least one write command of the plurality of write commands, determining a write capacity of using the first mode in the free area of the second area and a write capacity of using the second mode in the free area of the second area for writing all the remaining data of the corresponding write data, such that the write capacity of the first mode in the free area of the second area is maximally utilized and write all the remaining data of the corresponding write data to the determined write capacity using the first mode in the free area of the second area and the determined write capacity using the second mode in the free area of the second area, in response to determining the difference is larger than the capacity writable in the first mode of the free area of the second area.

9. The method of claim 8, wherein:

the nonvolatile memory has a structure in which data is unable to be overwritten to an area where data is already written, and includes a plurality of blocks; and the method further comprises:

selecting a block in the second area and in which data is stored using the first mode as a first movement source block of first valid data, selecting a first free block in the second area as a first movement destination block of the first valid data, and executing garbage collection for reusing areas where unnecessary data remains in the nonvolatile memory by writing the first valid data to the first destination block; and selecting one or both of a block in the first area and in which data is stored using the first mode and a block in the second area in and in which data is stored using the second mode as a second movement source block of second valid data, selecting a second free block in the second area as a second movement destination block of the second valid data, and executing garbage collection by writing the second valid data to the second destination block.

10. The memory system of claim 1, wherein the controller is configured to write, in the first mode, all of the write data to the free area of the first area, when the size of the write data is smaller than or equal to the capacity writable using the first mode in the free area of the first area.

11. The method of claim 8, further comprising, for at least one write command of the plurality of write commands, writing, in the first mode, all of the corresponding write data to the free area of the first area in response to determining the size of the corresponding write data is smaller than or equal to the capacity writable using the first mode in the free area of the first area.

* * * * *